(12) United States Patent
Luehrs et al.

(10) Patent No.: US 9,579,966 B2
(45) Date of Patent: Feb. 28, 2017

(54) HYBRID POWERTRAIN FOR A MOTOR VEHICLE, HYBRID VEHICLE, AND USE THEREOF

(71) Applicant: VOLKSWAGEN AKTIENGESELLSCHAFT, Wolfsburg (DE)

(72) Inventors: Georg-Friedrich Luehrs, Kassel (DE); Dirk Zeise, Kassel (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 172 days.

(21) Appl. No.: 14/423,559

(22) PCT Filed: Aug. 13, 2013

(86) PCT No.: PCT/EP2013/066877
§ 371 (c)(1),
(2) Date: Feb. 24, 2015

(87) PCT Pub. No.: WO2014/032961
PCT Pub. Date: Mar. 6, 2014

(65) Prior Publication Data
US 2015/0298535 A1 Oct. 22, 2015

(30) Foreign Application Priority Data
Aug. 25, 2012 (DE) .................. 10 2012 016 988

(51) Int. Cl.
*B60K 6/48* (2007.10)
*B60K 6/54* (2007.10)
(Continued)

(52) U.S. Cl.
CPC .............. *B60K 6/54* (2013.01); *B60K 6/365* (2013.01); *B60K 6/48* (2013.01); *B60K 6/547* (2013.01);
(Continued)

(58) Field of Classification Search
CPC ............ B60K 6/48; B60K 6/54; F16H 37/065
See application file for complete search history.

(56) References Cited

U.S. PATENT DOCUMENTS 6,811,508 B2   11/2004   Tumback
8,235,853 B2   8/2012    Lutoslawski
(Continued)

FOREIGN PATENT DOCUMENTS

DE           10021025 A1    11/2001
DE     102010046766 A1     3/2012
(Continued)

*Primary Examiner* — Derek D Knight
(74) *Attorney, Agent, or Firm* — Laurence A. Greenberg; Werner H. Stemer; Ralph E. Locher (57) ABSTRACT

A hybrid powertrain for a motor vehicle has an internal combustion engine and an electric machine that is connected to power electronics and to an electric energy storage device. The internal combustion engine is coupled to an internal combustion engine driveshaft and the rotor of the electric machine is coupled to an electric machine driveshaft that is connected to a planetary gear set with a sun gear, a planet carrier, and a ring gear, one element of which functions as an input element and another as an output element. The rotor of the electric machine can be selectively connected either to the input element or to the output element of the planetary gear set by way of a shiftable clutch).

13 Claims, 6 Drawing Sheets

(51) Int. Cl.
- *B60K 6/365* (2007.10)
- *B60K 6/547* (2007.10)
- *B60W 10/06* (2006.01)
- *B60W 10/08* (2006.01)
- *B60W 10/10* (2012.01)
- *B60W 30/188* (2012.01)
- *F16H 37/06* (2006.01)
- *F16H 3/093* (2006.01)

(52) U.S. Cl.
CPC ............ *B60W 10/06* (2013.01); *B60W 10/08* (2013.01); *B60W 10/10* (2013.01); *B60W 20/15* (2016.01); *B60W 30/1886* (2013.01); *F16H 37/065* (2013.01); *B60K 2006/4808* (2013.01); *B60K 2006/4841* (2013.01); *F16H 2003/0931* (2013.01); *F16H 2003/0933* (2013.01); *F16H 2200/0034* (2013.01); *F16H 2200/0043* (2013.01); *F16H 2200/2005* (2013.01); *Y02T 10/626* (2013.01); *Y02T 10/6221* (2013.01); *Y10S 903/91* (2013.01)

(56) References Cited

U.S. PATENT DOCUMENTS

| | | | |
|---|---|---|---|
| 2002/0088291 A1* | 7/2002 | Bowen | B60K 6/48 74/339 |
| 2006/0058146 A1* | 3/2006 | Brissenden | F16D 25/14 475/198 |
| 2007/0243966 A1* | 10/2007 | Holmes | B60K 6/365 475/5 |
| 2010/0173746 A1 | 7/2010 | Ideshio et al. | |
| 2012/0115677 A1 | 5/2012 | Sakai et al. | |
| 2012/0138405 A1 | 6/2012 | Falkenstein | |

FOREIGN PATENT DOCUMENTS

| | | |
|---|---|---|
| DE | 102010062337 A1 | 6/2012 |
| WO | 2008046185 A1 | 4/2008 |

* cited by examiner

HYBRID POWERTRAIN FOR A MOTOR VEHICLE, HYBRID VEHICLE, AND USE THEREOF

FIELD OF THE INVENTION

A hybrid drivetrain for a motor vehicle, having a combustion engine and having an electric machine which is connected to power electronics and to an electrical energy store and which has a stator and a rotor, which combustion engine and electric machine are connectable in torque-transmitting fashion to an output shaft, wherein
- the combustion engine is coupled to a combustion engine driveshaft which bears one or more driveshaft pinions,
- the rotor of the electric machine is coupled to an electric machine driveshaft, which bears one or more driveshaft pinions, via a planetary gear set comprising a sun gear, a web and internal gear, of which one element acts as input element and another element acts as output element of the planetary gear set,
- at least one driveshaft pinion of the combustion engine driveshaft forms a switchably torque-transmitting pinion pairing with a corresponding collective shaft pinion of a first collective shaft which is coupled in torque-transmitting fashion to the output shaft, and
- at least one driveshaft pinion of the electric machine driveshaft forms a torque-transmitting pinion pairing with a corresponding collective shaft pinion of a collective shaft which is coupled in torque-transmitting fashion to the output shaft.

The invention also relates to a motor vehicle having a hybrid drivetrain of said type and to a novel use thereof.

PRIOR ART

Generic drivetrains are known from DE 10 2010046 766 A1.

Hybrid vehicles having two drive units, specifically a combustion engine and an electric machine which can be operated both in the motor mode and in the generator mode, have long been known. In particular, the principle of the parallel hybrid is known, in which both the combustion engine and the electric machine are connectable in torque-transmitting fashion to the output shaft. In this case, the connection may be performed selectively, leading to purely electric driving operation or purely combustion-engine-powered driving operation, or in combined fashion, with both the electric machine and the combustion engine being connected to the output shaft simultaneously. Within combined operation, boost operation and recuperation operation are known. In boost operation, both drive units output positive torque to the output shaft; in recuperation operation, the electric machine operates in the generator mode and absorbs kinetic energy from the output shaft in order to convert it into electrical energy. This may take place for example during braking maneuvers of the motor vehicle. Alternatively, in this way, it is also possible for excess power which is output by the combustion engine when it is operating at the optimum operating point, but which is not demanded at the drive wheels in the present driving situation, to be recuperated.

In most known parallel hybrid concepts, the coupling of the two drive units is realized by way of more or less complex power-split transmission arrangements. DE 100 21 025 A1 and WO 2008/046185 A1 are cited here by way of example. Power-split transmissions always comprise at least two electric machines and a multiplicity of planetary gear sets, the individual elements of which are connectable to one another by means of switchable clutches or to a transmission housing by means of brakes. In this way, it is possible to realize the operating modes discussed above and possibly different drive stages within said operating modes, wherein the setting of a suitable transmission ratio may be performed in a downstream shift transmission or, by means of a correspondingly complex construction of the power-split transmission, in continuously variable fashion in the latter. In the case of the downstream shift transmission, concepts from purely combustion-engine-powered drivetrains are often resorted to, in particular the dual-clutch transmission, which permits gearshifts without interruption in traction force. In DE 100 21 025 A1 cited above, the second electric machine is used instead of a dual-clutch transmission to ensure the absence of interruption in traction force.

The generic document DE 10 2010 046 766 A1 cited above discloses a hybrid drivetrain having a combustion engine and an electric machine which are arranged coaxially with respect to one another and axially adjacent to one another. Each of said drive units is coupled indirectly to a driveshaft assigned thereto, wherein the driveshaft of the combustion engine extends coaxially through that of the electric machine. Each of the driveshafts has multiple driveshaft pinions which mesh with a respectively associated collective shaft pinion of a collective shaft arranged as a parallel countershaft. The pinion pairings thus formed are each of switchable configuration by virtue of in each case one pinion of each pairing being arranged as a fixed gear and the other pinion of each pairing being arranged as a floating gear on the associated shaft, wherein the respective floating gear is connectable rotationally conjointly to its associated shaft by means of a switchable clutch. Through suitable actuation of the clutches and drive units, the torques thereof can be transmitted to the collective shaft with different transmission ratios predefined in each case by the selected pinion pairing. The output pinion of said collective shaft meshes with the input pinion of an output shaft which drives the downstream drivetrain output section, and which may for example be connected to a downstream differential. Whereas the coupling between the combustion engine and its associated driveshaft is substantially direct, aside from a switchable clutch, the driveshaft of the electric machine is coupled indirectly thereto by means of a planetary gear set. In particular, the rotor of the electric machine is connected rotationally conjointly to the sun gear of the planetary gear set, whereas the web of the planetary gear set is connected rotationally conjointly to the electric machine driveshaft. Furthermore, the internal gear of the planetary gear set is connected to the combustion engine driveshaft, such that the two drive paths are not independent of one another. Aside from this lack of independency, the considerable axial structural size of the known device is also a disadvantage; this arises substantially from the axial space requirement of the numerous driveshaft pinions arranged axially adjacent to one another. The number thereof is defined by the desired number of selectable gear ratios in the known drivetrain.

BRIEF SUMMARY OF THE INVENTION

It is the object of the present invention to further develop a generic drivetrain such that the axial structural size is reduced without a reduction in the number of selectable gear ratios.

Said object is achieved, in in accordance with the claims, in that the rotor of the electric machine is selectively connectable to either the input element or the output element of the planetary gear set by means of a switchable clutch. Said switchable clutch will be referred to hereafter as planetary gear set clutch.

The dependent claims relate to preferred embodiments of the invention.

A central feature of the invention is the switchability of the indirect coupling between the electric machine and the driveshaft assigned thereto by means of the planetary gear set. In the situation in which the electric machine is connected by means of the planetary gear set clutch directly to the output element of the planetary gear set, a substantially direct connection between the electric machine and its driveshaft is realized. In the other position of the planetary gear set clutch, in which the electric machine is connected to the input element of the planetary gear set, said connection is realized indirectly, specifically via the transmission mechanism of the planetary gear set, in which the torque flow runs from the input element to the output element connected to the electric machine driveshaft. Correspondingly, a transmission ratio is realized here. It is thus possible for two different gear ratios to be realized per driveshaft pinion of the electric machine driveshaft, which substantially halves the axial structural size in relation to known devices which provide only one gear ratio per driveshaft pinion.

The invention can be realized in two basic variants which differ in terms of the path of torque transmission from the electric machine driveshaft to the output shaft. Whereas it is the case in the first invention variant, as in the generic prior art, that said torque transmission takes place via the same collective shaft via which torque can also be transmitted from the combustion engine to the output shaft, and which is referred to in this case as first collective shaft, it is the case in the second variant that the flow of the electric machine torque takes place via a dedicated collective shaft, which is referred to in this case as second collective shaft and which in this case, in the strictest sense, does not "collect" torques of different units but acts purely as an intermediate shaft.

The first invention variant as claimed can thus be defined as being such that that collective shaft whose collective shaft pinion forms a torque-transmitting pinion pairing with the driveshaft pinion of the electric machine driveshaft is the first collective shaft. By contrast, the second invention variant presented in claim 3 can be defined as being such that that collective shaft whose collective shaft pinion forms a torque-transmitting pinion pairing with the driveshaft pinion of the electric machine driveshaft is a second collective shaft, whose collective shaft pinions do not form a pinion pairing with driveshaft pinions of the combustion engine driveshaft.

In one refinement of the invention, it is provided that at least one driveshaft pinion of the combustion engine driveshaft forms a switchably torque-transmitting pinion pairing with a corresponding collective shaft pinion of a third collective shaft, which is coupled in torque-transmitting fashion to the output shaft. At the combustion engine driveshaft side, said pinion pairings preferably involve the same pinions as are also involved in the pinion pairings with the first collective shaft. This means that the concept of the collective shaft is realized once again at least for the combustion engine. In this way, further axial structural space is saved because each driveshaft pinion of the combustion engine driveshaft forms, both with a collective shaft pinion of the first collective shaft and with a collective shaft pinion of the third collective shaft, in each case one torque-transmitting pinion pairing with unique transmission ratio. It is thus possible to realize two gear ratios per driveshaft pinion of the combustion engine driveshaft, which again entails a considerable saving in axial structural space. In this case too, said third collective shaft need not be a shaft which "collects" torques of multiple units in the strictest literal sense. An intermediate shaft which merely interacts with a unit is sufficient.

This embodiment, which leads to a structural form which is extremely compact also in a radial direction, can be realized in particular if, as is preferably provided, the output shaft is arranged parallel to and radially spaced apart from both the driveshafts of combustion engine and electric machine and each collective shaft. Only the electric machine driveshaft and the combustion engine driveshaft are preferably arranged coaxially with respect to one another, wherein said driveshafts are particularly preferably arranged so as to extend one through the other.

The sun gear of the planetary gear set expediently acts as the input element thereof, and the web of the planetary gear set expediently acts as the output element connected to the electric machine driveshaft, wherein the internal gear of the planetary gear set is expediently arranged so as to be fixed with respect to a housing. The planetary gear set clutch is preferably configured so as to connect the rotor of the electric machine selectively either to the sun gear or to the web. Since, as explained above, the web, as output element of the planetary gear set, is connected to the electric machine driveshaft, the former switching position means that the planetary gear set acts as a simple transmission stage, whereas in the latter switching position, there is a direct torque flow between rotor and electric machine driveshaft.

The switchable pinion pairings are expediently each formed by two intermeshing pinions, of which at least one is coupled by means of a switchable positively locking clutch to its associated shaft. The switchable positively locking clutches are in this case preferably in the form of synchronizers or jaw clutches. Whereas the variant with simple jaw clutches exhibits better efficiency, but requires more complex control with regard to the synchronization of the rotational speeds of the shafts involved, the variant with synchronizers is easier to implement from a control aspect, but is associated with low efficiency losses owing to the friction losses of the synchronizing rings of the synchronizers.

In one refinement of the invention, it is provided that the rotor of the electric machine and the combustion engine driveshaft are connectable to one another by means of a switchable main shaft clutch. A person skilled in the art will identify that, in the context of the embodiments discussed above, the two drive units can operate fully independently of one another. The latter refinement of the invention additionally permits direct interaction between the two units, such that gear ratios, that is to say transmission ratios, which are provided primarily for use with one unit can alternatively also be driven by the other unit. Furthermore, it is possible in this way to realize combined operating modes, such that all known hybrid operating modes can be implemented. This relates for example to boosting and also to recuperation.

A particular recuperation scenario is the use of a hybrid vehicle with a drivetrain according to the invention as a static generator. The operation of mobile electrical appliances remote from power networks is often desirable. Examples in this regard are forestry appliances such as electric chainsaws or the like in woodland areas. If the hybrid vehicle according to the invention has an electrical connection point, for example a plug socket, which is connected to the power electronics and to the electrical energy store, the motor vehicle itself can be used as a static electrical generator, wherein the rotor of the electric machine and the combustion engine driveshaft are connected rotationally conjointly to one another by means of the main shaft clutch, an electrical consumer is connected to the connection interface, and the electric machine is operated in the generator mode, while the combustion engine is, by way of the power electronics, controlled so as to operate at engine speeds in accordance with the present power consumption of the electrical consumer.

Further features and advantages of the invention will emerge from the following specific description and from the drawings.

DETAILED DESCRIPTION OF PREFERRED EMBODIMENTS

In the figures, the same reference signs are used to denote identical or analogous elements.

Figure 1:
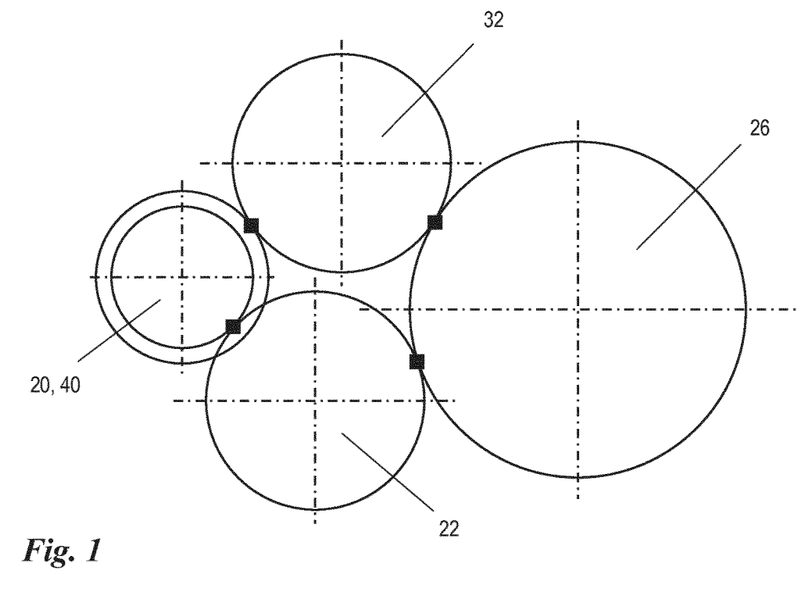
FIG. 1 is a schematic cross-sectional illustration of the shaft arrangement of an embodiment of a first invention variant.
Figure 3:
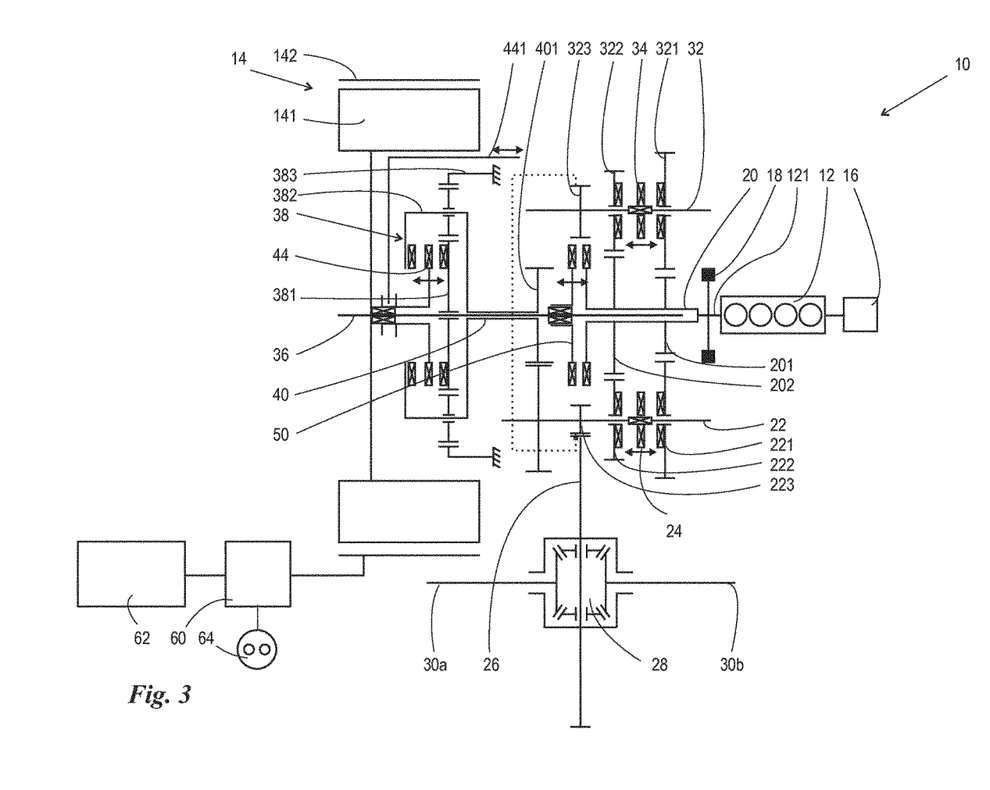
FIG. 3 shows a schematic overview sketch of an embodiment of the first invention variant.

FIG. 1 is a schematic cross-sectional illustration of an embodiment of the first invention variant, the topology of which is illustrated in the overview sketch in FIG. 3. These two figures will be discussed jointly below. The arrangement shown will hereinafter be referred to, for short, as a 3-shaft arrangement. A drivetrain 10 has two drive units, specifically a combustion engine 12 and an electric machine 14, comprising an internal rotor 141 and an external stator 142. In the embodiment illustrated, the combustion engine 12 is connected to a start/stop unit 16, which is however not of central significance for the present invention. The crankshaft 121 of the combustion engine 12 is coupled, by way of a dual-mass flywheel 18, to a combustion engine driveshaft 20, which in the embodiment shown is in the form of a hollow shaft. The combustion engine driveshaft bears two driveshaft pinions 201, 202 which, in the embodiment shown, are arranged, as fixed gears, in an axially fixed and rotationally conjoint manner on the combustion engine driveshaft 20. Each of the driveshaft pinions 201, 202 forms a switchable pinion pairing with a respectively corresponding collective shaft pinion 221, 222 which is arranged as a floating gear on a first collective shaft 22. For this purpose, the first collective shaft 22 is equipped with a first collective shaft clutch 24 which, depending on switching position, couples the floating gear 221, the floating gear 222 or neither of the two floating gears 221, 222 rotationally conjointly to the first collective shaft 22. A person skilled in the art will identify that, depending on the switching position of the first collective shaft clutch 24, a torque can be transmitted from the combustion engine 12 to the collective shaft 22 with a transmission ratio predefined by the specific pinion pairing. An output pinion 223 of the first collective shaft 22 meshes with an input pinion of an output shaft 26 which, in the embodiment shown, is connected to the differential cage of a transverse differential 28. Via the axle flange shafts 30a, 30b thereof, the torque is transmitted to drive wheels (not illustrated) of a motor vehicle.

Furthermore, each driveshaft pinion 201, 202 of the combustion engine driveshaft 20 forms a switchable pinion pairing with a respectively corresponding collective shaft pinion 321, 322 of a further collective shaft, which in this case is referred to as third collective shaft 32. The collective shaft pinions 321, 322 are in the form of floating gears in the embodiment shown. The third collective shaft 32 has a third collective shaft clutch 34 which, depending on switching position, couples either one floating gear 321, the other floating gear 322 or neither of the two floating gears rotationally conjointly to the third collective shaft 32. Furthermore, the third collective shaft 32 has an output pinion 323 which, like the output pinion 223 of the second collective shaft 22, meshes with the input pinion of the output shaft 26. Said connection is illustrated as a dotted, arrowed line in the illustration of FIG. 3. A person skilled in the art will identify that, depending on the switching position of the third collective shaft clutch 32, a torque of the combustion engine 12 can be transmitted to the output shaft 26 via the third collective shaft 32 with a transmission ratio predefined by the respectively engaged pinion pairing. In this case, it is self-evidently necessary for the switching positions of the two collective shaft clutches 24 and 34 to be coordinated with one another such that the torque flow runs in each case via only one of the two collective shafts 22 or 32.

The spatial arrangement of the shafts can be seen more clearly in FIG. 1. In said figure, possible torque transmission points are indicated by black squares, although only the shafts themselves and not specific pinions are denoted by reference signs. However, the spatial structure of the drivetrain according to the invention will clearly emerge to a person skilled in the art from the juxtaposition of FIGS. 1 and 3.

The torque of the electric machine 14 is output by the rotor 141 thereof initially to the rotor shaft 36. Said rotor shaft runs coaxially with respect to the combustion engine driveshaft 20. However, the rotor shaft 36 does not constitute for example the counterpart to the combustion engine driveshaft 20. For this purpose, the electric machine driveshaft 40 is provided, which, as a hollow shaft, is arranged coaxially with respect to, and is extended through by, the rotor shaft 36. The electric machine driveshaft 40 bears a drive pinion 401 which meshes with a further collective shaft pinion 224 of the first collective shaft 22. In accordance with the terminology used in the general part of the description and in the claims, this would have to be referred to as a "second" collective shaft, which in the embodiment shown in FIG. 3 is however identical to the first collective shaft. Said collective shaft thus simultaneously performs the function of transmitting combustion engine torque (first collective shaft) and electric machine torque (second collective shaft) to the output shaft 26, and thus acts as a "true" collective shaft.

To transmit the torque of the electric machine 14 from the rotor shaft 36 thereof to the electric machine driveshaft 40, a planetary gear set 38 is provided, which comprises a sun gear 381, a web 382 and an internal gear 383, which is fixed with respect to a housing. The electric machine driveshaft 40 is connected rotationally conjointly to the web 382, which therefore acts as output element of the planetary gear set 38. The connection of the rotor shaft 36 to the planetary gear set 38 is realized by means of the planetary gear set clutch 44, which, depending on switching position, connects the rotor shaft 36 in torque-transmitting fashion to the sun gear 381, which serves as input element of the planetary gear set 38, to the web 382, or to neither of said elements. Depending on the switching position of the planetary gear set clutch 44, the torque of the electric machine is thus conducted to the driveshaft pinion 401, and via the latter to the first collective shaft 22 and the output shaft 26, with a different transmission ratio. The actuation mechanism which serves for the actuation of the planetary gear set clutch 44 is indicated in FIG. 3 by the reference sign 441.

Furthermore, FIG. 3 also shows a main shaft clutch 50 which, depending on switching position, couples the rotor shaft 36 and the combustion engine driveshaft 20, which are arranged coaxially and so as to extend one through the other in regions, to one another in switchable fashion. In the connected state, it is for example possible here for torque to be conducted from the electric machine directly to the combustion engine 12 for starting purposes. Conversely, for the generator mode of the electric machine 14, torque can be conducted from the combustion engine 12 to the electric machine 14. It is also possible in this way to realize typical hybrid operating modes such as boosting or recuperation.

Finally, FIG. 3 also depicts power electronics 60 and a battery 62 as electrical energy store. These are connected to an electrical interface 64 to which external electrical appliances can be connected.

Figure 4:
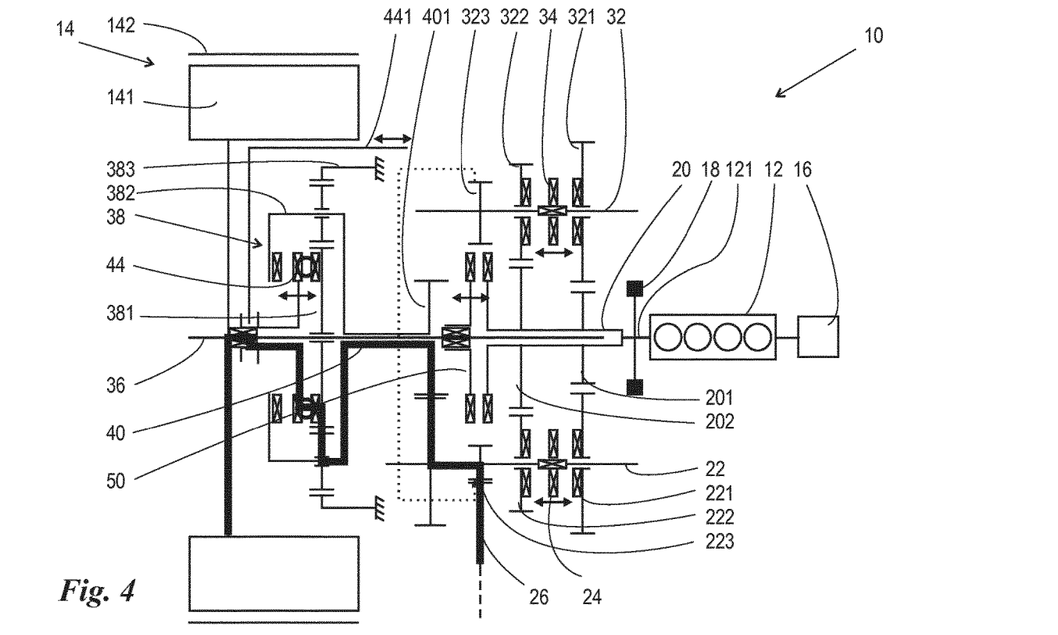
FIG. 4 shows the illustration of FIG. 3, with the torque profile in a first switching position indicated.

FIGS. 4 to 8 show the torque flow in a drivetrain as per FIG. 3 in selected switching positions of the switchable elements discussed above. In FIG. 4, a low electric gear ratio is realized. For this purpose, the planetary gear set clutch has been switched such that the rotor shaft 36 is connected to the sun gear 381 of the planetary gear set 38. The planetary gear set 38 then acts as a transmission stage, such that the torque is conducted via the web 382 thereof to the electric machine driveshaft 40. Via the driveshaft pinion 401 thereof, the torque flows to the first collective shaft 22, and from the latter to the output 26. The other clutches 24, 34 and 50 are in this case situated in a non-torque-transmitting switching position.

Figure 5:
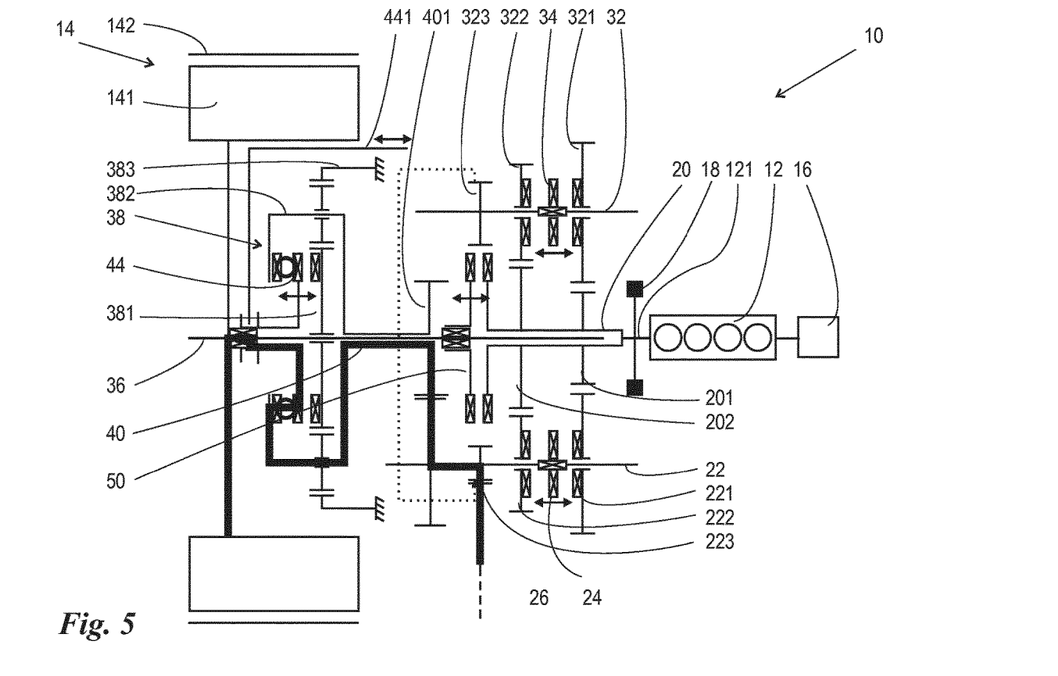
FIG. 5 shows the illustration of FIG. 3, with the torque profile in a second switching position indicated.

FIG. 5 shows the implementation of a higher electric gear ratio. By contrast to the switching position of FIG. 4, it is the case here that the planetary gear set clutch 44 connects the rotor shaft 36 directly to the web 382 of the planetary gear set 38. The electric machine torque is thus conducted to the electric machine driveshaft 40 without a further transmission ratio. Reference may also be made to that which has been stated above with regard to FIG. 4.

Figure 6:
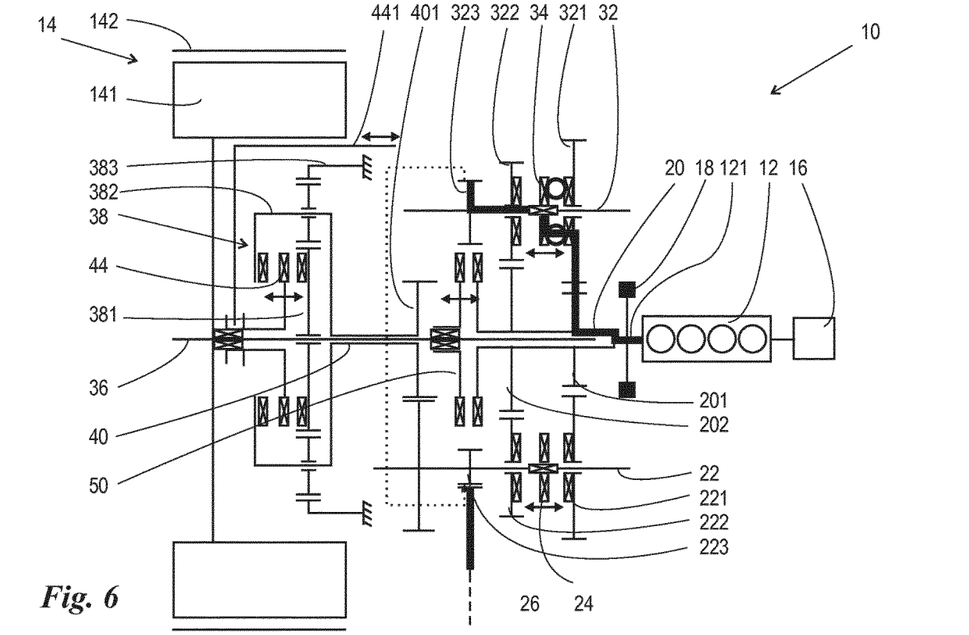
FIG. 6 shows the illustration of FIG. 3, with the torque profile in a third switching position indicated.

FIG. 6 shows the implementation of a low combustion-engine gear ratio. The torque of the combustion engine 12, which directly drives the combustion engine driveshaft 20, runs via the pinion pairing 201/221 to the third collective shaft 32. For this purpose, the third collective shaft clutch 34 has been switched such that the collective shaft pinion 321 is connected rotationally conjointly to the third collective shaft 32. The torque runs to the output shaft 26 via the output pinion 323 of the third collective shaft 32 (along the connection illustrated by a dotted line).

Aside from the third collective shaft clutch 34, all of the other clutches are situated in a non-torque-transmitting switching state.

Figure 7:
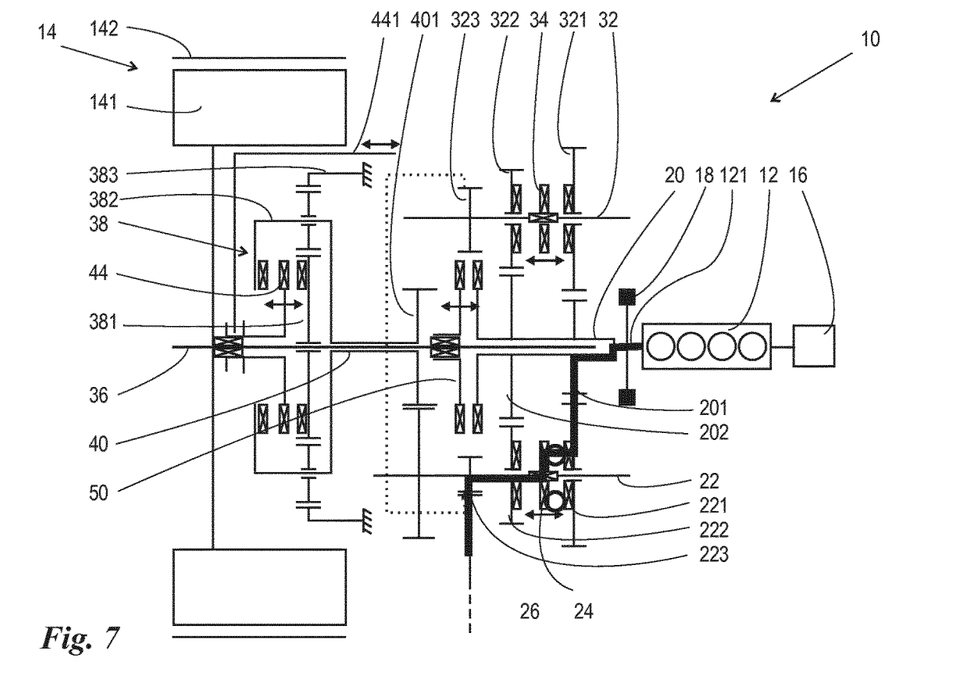
FIG. 7 shows the illustration of FIG. 3, with the torque profile in a fourth switching position indicated.

FIG. 7 shows the implementation of a higher combustion-engine gear ratio. In this case, the torque flows from the combustion engine 12 directly to the combustion engine driveshaft 20 and via the pinion connection 201/221 to the first collective shaft 22. For this purpose, the first collective shaft clutch 24 has been switched such that the collective shaft pinion 221 is connected rotationally conjointly to the first collective shaft 22. The torque flows to the output 26 via the output gear 223 of the second collective shaft 22. In this case, all of the other clutches are situated in a non-torque-transmitting switching state.

A person skilled in the art will identify that two further gear ratios can be realized by way of the pinion pairings 202/222 and 202/322 in an analogous manner.

Figure 8:
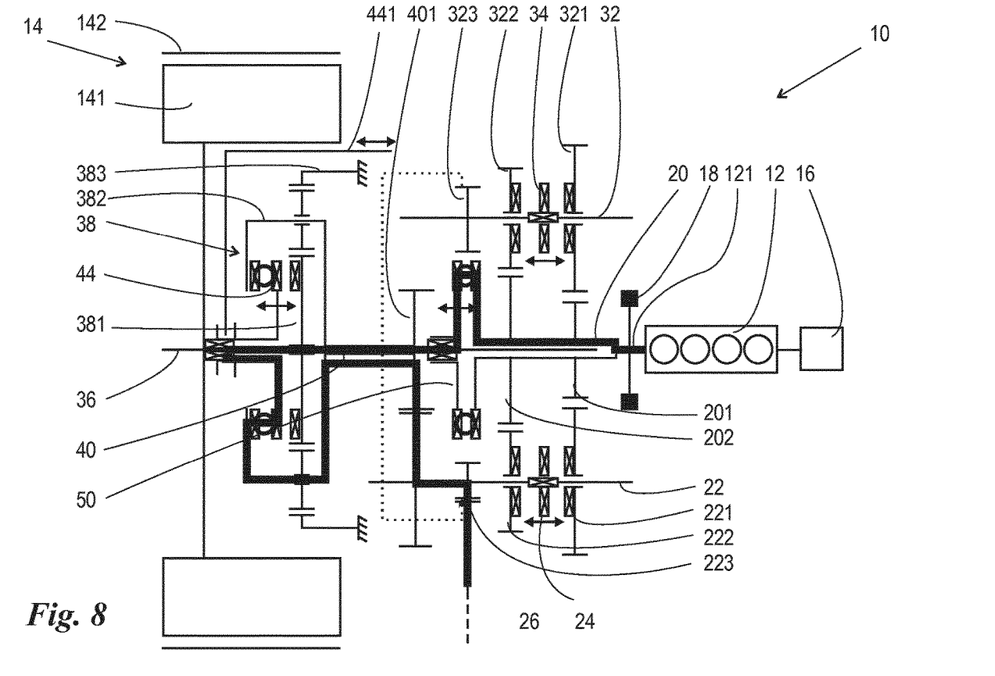
FIG. 8 shows the illustration of FIG. 3, with the torque profile in a fifth switching position indicated.

FIG. 8 shows the implementation of the same gear ratio as in FIG. 5, wherein, however, the original torque originates not from the electric machine 14 but from the combustion engine 12. For this purpose, in addition to the switching position of the planetary gear set clutch 44 described in conjunction with FIG. 5, the main shaft clutch 50 has been closed such that the torque of the combustion engine 12 flows from the combustion engine driveshaft 20 via the main shaft clutch 50 to the rotor shaft 36, and from there to the output 26 in the manner described in conjunction with FIG. 5. In this case, the rotor 141 of the electric machine 14 may co-rotate freely or may be electrically driven in a synchronized manner, for example in order to implement an extremely high-torque gear ratio, for example for uphill travel with a trailer.

Figure 2:
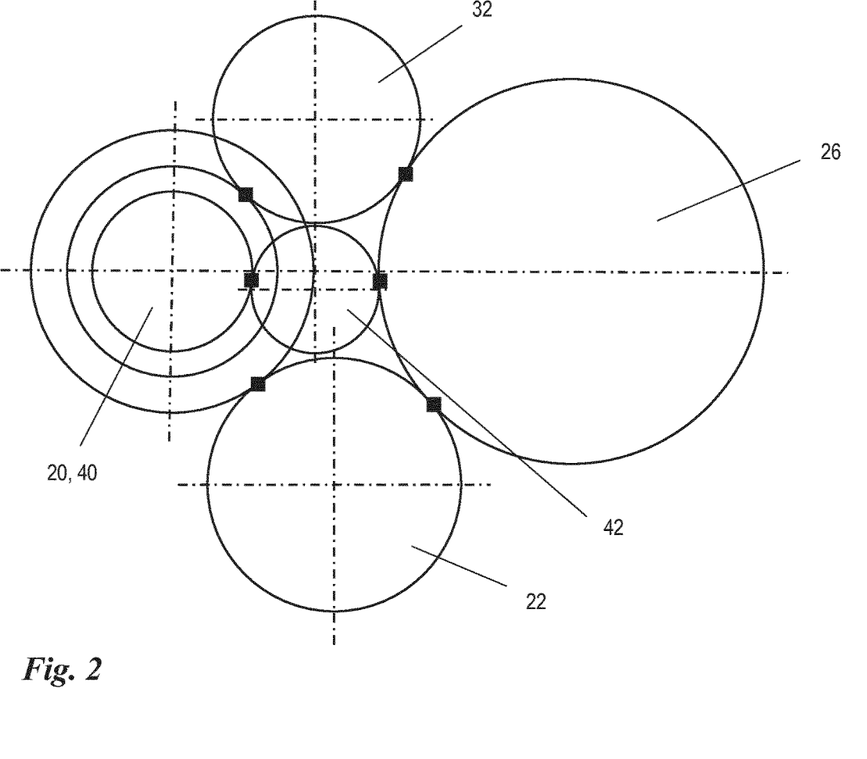
FIG. 2 is a schematic cross-sectional illustration of the shaft arrangement of an embodiment of a second invention variant.
Figure 9:
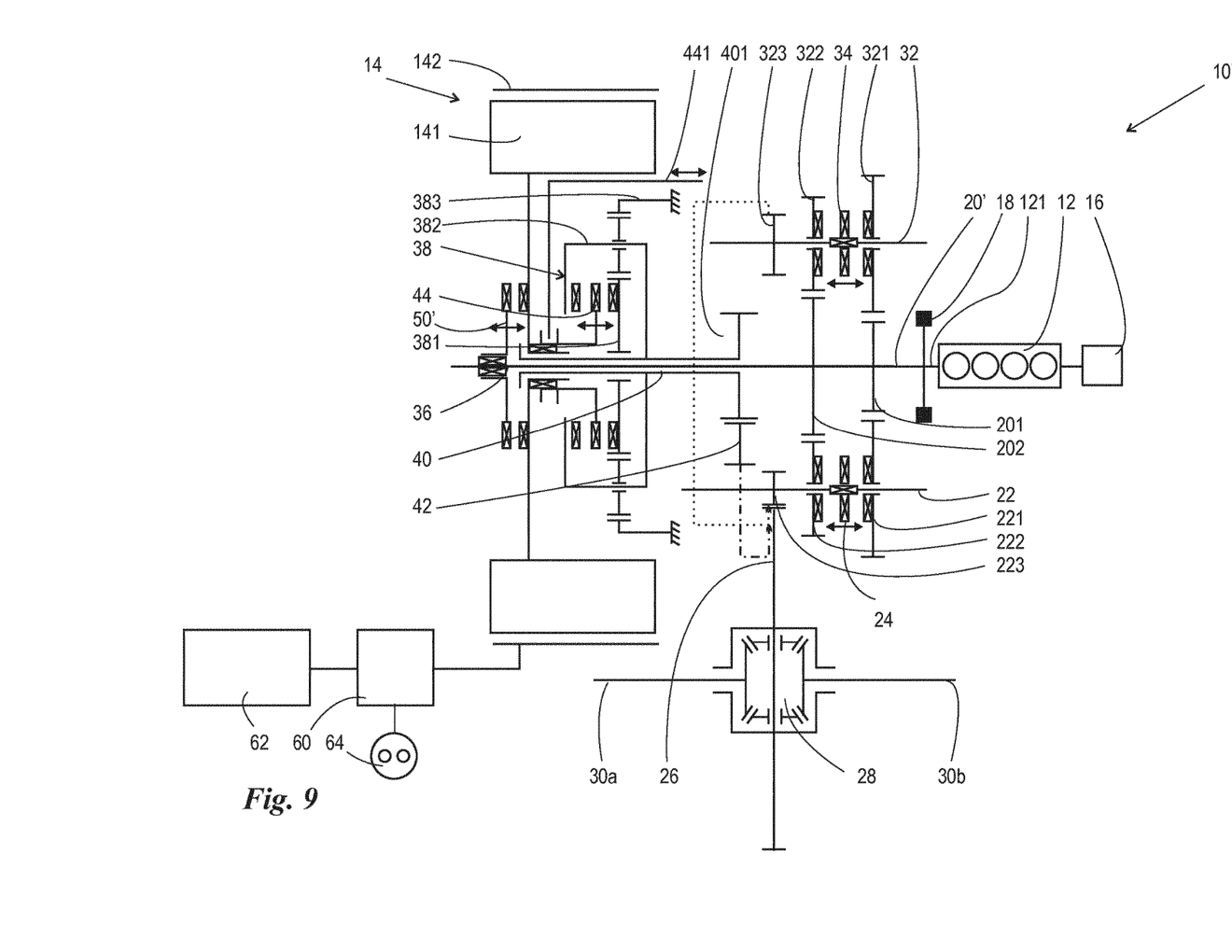
FIG. 9 shows a schematic overview sketch of an embodiment of the second invention variant.

FIG. 9, which is to be viewed in conjunction with FIG. 2, shows the topology of the second variant of the present invention, which in this case is to be referred to as a 4-shaft arrangement. In the modified drivetrain 10' of FIG. 9, those components which are substantially identical to the components in FIG. 3 are denoted by the same reference signs as in FIG. 3. Modified elements are, in reference to the analogous elements of FIG. 3, denoted in each case by the same reference sign with the suffix "'". The main difference between the drivetrain 10' and the drivetrain 10 of FIG. 3 is the second collective shaft 42, which acts as an intermediate shaft between the driveshaft pinion 401 of the electric machine driveshaft 40 and the input pinion 26 of the output. The connection between the second collective shaft 42 and the output 26 is denoted in FIG. 9 as a dash-dotted, arrowed line. The spatial position of the shafts can be seen more clearly from FIG. 2.

A further modification can be seen in the fact that the main shaft clutch 50' has been "pulled out". The marginal arrangement has the advantage of better accessibility than the central arrangement in FIG. 3. For this purpose, the combustion engine driveshaft 20' is formed no longer as a hollow shaft but as a core shaft which extends over the entire length of the drivetrain 10' and which in particular extends axially through the electric machine driveshaft 40. Reference is also made directly or in analogous fashion to that which has been stated above.

The embodiments discussed in the specific description and shown in the figures self-evidently constitute merely illustrative exemplary embodiments of the present invention. A broad spectrum of possible variants emerges to a person skilled in the art in the light of this disclosure. In particular, the number of pinions and corresponding drive stages illustrated in the figures does not constitute a restriction of the present invention. Also, the invention is not restricted to the front/transverse arrangement shown in the figures. For a person skilled in the art, it would be easy, through suitable rearrangement of the elements and possible addition of diverting elements, to realize front/transverse arrangements or arrangements with multiple driven axles, the latter in particular through the use of a longitudinal differential. Rearrangement of the elements, for example of the drive units, in relation to one another and in relation to the core transmission is also possible within the individual arrangements.

LIST OF REFERENCE NUMERALS 10, 10' Drivetrain
12 Combustion engine
121 Crankshaft of 12
14 Electric machine
141 Rotor of 14
142 Stator of 14
16 Start/stop unit
18 Dual mass flywheel
20, 20' Combustion engine driveshaft
201, 202 Driveshaft pinion of 20, 20'
22 First collective shaft
221, 222 Collective shaft pinions of 22
223 Output pinion of 22
24 First collective shaft clutch
26 Output shaft
28 Differential
30a, b Driven steering knuckle
32 Third collective shaft
321, 322 Collective shaft pinions of 32
323 Output pinion of 32
34 Third collective shaft clutch
36 Rotor shaft
38 Planetary gear set
381 Sun gear
382 Web
383 Internal gear
40 Electric machine driveshaft
401 Driveshaft pinion of 40
42 Second collective shaft
44 Planetary gear set clutch
50, 50' Main shaft clutch
60 Power electronics
62 Battery
64 Electrical interface

The invention claimed is:

1. A hybrid drivetrain for a motor vehicle, comprising:
a combustion engine coupled to a combustion engine driveshaft, said combustion engine driveshaft carrying one or more driveshaft pinions;
an electric machine connected to power electronics and to an electrical energy storage device, said electric machine having a stator and a rotor;
said combustion engine and said electric machine being connectable for torque-transmission to an output shaft;
an electric machine driveshaft carrying one or more driveshaft pinions, and a planetary gear set coupling said rotor of said electric machine to said electric machine driveshaft, said planetary gear set having a plurality of elements including a sun gear, a web, and an internal gear, and wherein one of said elements acts as input element and another of said elements acts as an output element of said planetary gear set;
at least one driveshaft pinion of the combustion engine driveshaft forming a switchably torque-transmitting pinion pairing with a corresponding collective shaft pinion of a first collective shaft that is coupled for torque-transmission to said output shaft;
at least one driveshaft pinion of said electric machine driveshaft forming a torque-transmitting pinion pairing with a corresponding collective shaft pinion of a collective shaft that is coupled for torque-transmission to said output shaft; and
a switchable clutch configured to selectively connect said rotor of said electric machine to said input element or to said output element of said planetary gear set.

2. The drivetrain according to claim 1, wherein said collective shaft whose collective shaft pinion forms the torque-transmitting pinion pairing with said driveshaft pinion of said electric machine driveshaft is a first collective shaft.

3. The drivetrain according to claim 1, wherein said collective shaft whose collective shaft pinion forms the torque-transmitting pinion pairing with said driveshaft pinion of said electric machine driveshaft is a second collective shaft, whose collective shaft pinions do not form a pinion pairing with driveshaft pinions of said combustion engine driveshaft.

4. The drivetrain according to claim 1, wherein at least one of said driveshaft pinions of said combustion engine driveshaft forms a switchably torque-transmitting pinion pairing with a corresponding collective shaft pinion of a third collective shaft, which is coupled in torque-transmitting fashion to said output shaft.

5. The drivetrain according to claim 1, wherein said output shaft is disposed parallel to and radially spaced apart from said combustion engine driveshaft and said electric machine driveshaft and each said collective shaft.

6. The drivetrain according to claim 1, wherein said electric machine driveshaft and said combustion engine driveshaft are disposed coaxially with respect to one another.

7. The drivetrain according to claim 6, wherein said electric machine driveshaft and said combustion engine driveshaft are arranged so as to extend one through the other in sections.

8. The drivetrain according to claim 1, wherein said switchable clutch is configured to selectively connect said rotor of said electric machine either to said sun gear, which acts as the input element, or to said web, which acts as the output element, of the planetary gear set.

9. The drivetrain according to claim 8, wherein said internal gear of said planetary gear set is arranged fixedly with respect to a housing.

10. The drivetrain according to claim 1, which comprises a switchable main shaft clutch disposed to selectively connect said rotor of said electric machine and said combustion engine driveshaft to one another.

11. A hybrid vehicle, comprising a drivetrain according to claim 1.

12. The hybrid vehicle according to claim 11, further comprising:
a switchable main shaft clutch disposed to selectively connect said rotor of said electric machine and said combustion engine driveshaft to one another; and
an electrical connection interface connected to said power electronics and to said electrical energy storage device to form an electrical unit;
wherein said rotor of said electric machine and said combustion engine driveshaft are connected to one another for conjoint rotation by way of said main shaft clutch and said electric machine is operated in generator mode;

wherein, with an electrical consumer connected to said connection interface, said combustion engine is controlled by way of said power electronics to operate at an engine speed in accordance with a current power consumption of the electrical consumer.

13. A method of operating a hybrid vehicle having a hybrid drive according to claim 1 and a switchable main shaft clutch disposed to selectively connect the rotor of the electric machine to the combustion engine driveshaft, the method comprising:

connecting an electrical consumer to an electrical connection interface of the hybrid vehicle, the interface being connected to the power electronics and to the electrical energy storage device;

connecting the rotor of the electric machine and the combustion engine driveshaft to one another for conjoint rotation by way of the main shaft clutch for operating the electric machine in generator mode; and controlling the combustion engine with the power electronics so as to operate at engine speeds in accordance with a current power consumption of the electrical consumer.

* * * * *